United States Patent [19]

Anderson

[11] Patent Number: 4,948,502
[45] Date of Patent: Aug. 14, 1990

[54] APPARATUS FOR FILTERING INDUSTRIAL LIQUIDS
[75] Inventor: Raymond L. Anderson, Walled Lake, Mich.
[73] Assignee: H. R. Black Company, Inc., Warren, Mich.
[21] Appl. No.: 438,794
[22] Filed: Nov. 20, 1989

Related U.S. Application Data
[62] Division of Ser. No. 338,944, Apr. 17, 1989.
[51] Int. Cl.$^5$ .......................................... B01D 33/056
[52] U.S. Cl. ................................... 210/387; 210/401; 210/416.5
[58] Field of Search ............... 210/168, 171, 387, 401, 210/406, 416.1, 416.5

[56]  References Cited
U.S. PATENT DOCUMENTS

| | | | |
|---|---|---|---|
| 3,087,620 | 4/1963 | Hirs | 210/401 |
| 3,091,336 | 5/1963 | Hirs | 210/387 |
| 3,221,885 | 12/1965 | Hirs | 210/387 |
| 3,404,779 | 10/1968 | Weathers | 210/387 |
| 4,650,571 | 3/1987 | Anderson | 210/86 |

Primary Examiner—W. Gary Jones
Assistant Examiner—Matthew O. Savage
Attorney, Agent, or Firm—Dykema Gossett

[57] ABSTRACT

An apparatus for filtering industrial processing liquids is disclosed which includes a tank, a continuous conveyor screen positioned in and defining a loop in the tank, and a continuous filter media placed on an outer surface of the conveyor. The apparatus includes a power operated tractor chain sludge elevator guidably mounted within the tank extending along and frictionally engaging an outer surface return portion of the filter media for effecting a positive upward lift movement of adjacent portions of the filter media with accumulated sludge thereon. The apparatus may also include an apertured horizontal partition in the tank, the filter media sealed over the aperture defining a filtered liquid reservoir chamber positioned below the partition and an unfiltered liquid chamber above the partition, an opened-top vacuum chamber sealed to the filter media and immersed within the filtered liquid chamber positioned within the aperture so as to form a peripheral channel between the aperture and vacuum chamber. An alternate embodiment of the invention includes an open top vacuum chamber with an unfiltered reservoir, a continuous sealing channel upon and surrounding the vacuum chamber, a filter media within the unfiltered reservoir and extending over and sealingly engaging the channel, the channel having a continuous slot in its top defining inner and outer sealing surfaces engaging the filter media. The channel in either embodiment may be connected to a positive or negative pressure source for discouraging the flow of unfiltered liquid into the vacuum chamber.

5 Claims, 5 Drawing Sheets ic chamber in an unde-
APPARATUS FOR FILTERING INDUSTRIAL LIQUIDS This is a divisional of co-pending application Ser. No. 07/338,944 filed on Apr. 17, 1989.

FIELD OF INVENTION

The present invention relates to a method of filtering industrial processing liquid and apparatus, and more particularly to the mounting of a disposable or continuous filter media so as to sealingly engage a vacuum chamber within a filtration tank for the passage of filtered liquids therethrough.

BACKGROUND OF THE INVENTION

In the filtration of industrial processing liquids, such liquid pass through a generally continuous filter media within a tank into a vacuum chamber having an outlet connected to a conduit which extends outwardly of the tank and is adapted for connection to a pump for feeding filtered liquids back to a processing apparatus, for illustration. It is known in the art that from time to time there is a build-up of debris and sludge upon the filter media at the area where it covers the open-top inlet to the vacuum chamber to such an extent that there is a greatly reduced flow of filtered liquids through the media and through the outlet of the vacuum chamber. Various automatic means are known based upon a vacuum build-up within the vacuum chamber such that when the vacuum reaches a preset value, a vacuum-responsive valve or switch operates a control mechanism for effecting longitudinal feed of a filter screen which is guidably mounted within the tank for a simultaneous longitudinal incremental feed movement of the filter media such as to present a clean filter media to the open top inlet of the vacuum chamber. Normally, a vacuum release valve functions initially to break the vacuum within the vacuum chamber and in a timed manner energizes the drive mechanism which feeds sprocket chains or the like for advancing the filter screen with the filter media moving therewith.

SUMMARY OF THE INVENTION

An important feature of the present invention is to provide an improved method and apparatus for moving the filter media using a tractor chain assembly which is mountable upon and along a return portion of the filter media and adjacent screen so as to operatively engage portions of the filter media to provide a positive lifting advance thereof transporting the filter media and accumulated sludge or debris thereon upwardly and out of the tank for disposal.

Previously, with sufficient loading of debris or sludge upon return portions of the filter media, as it is being elevated from the tank, the weight is such that there is insufficient frictional drive between the power-advanced supporting screen for the media and the media itself such that there is slippage, or alternately there may be such sufficient grease accumulation upon the screen that the screen itself is ineffective in elevating the sludge-accumulated media as it is advanced.

Previously, in the operation of industrial filtration apparatus for wash liquids and the like, there has been contamination between the unfiltered liquids and the filtered liquids due to improper sealing between the filter media and the support thereof within the tank and with respect to the vacuum chamber such that unfiltered liquids may enter the vacuum chamber in an undesirable and unintentional manner.

As still another feature, various types of vacuum chamber isolation mechanisms are provided within the tank to provide an improved seal between the vacuum chamber and the filter media such as to exclude unwanted unfiltered liquid from entering into the vacuum chamber except for passage through the filter media.

These and other features and objects will be seen from the following specification and claims in conjunctin with the appended drawings.

It will be understood that the above schematic drawings are illustrative of several embodiments of the invention, and of the method of filtering industrial liquids, and other embodiments are contemplated within the scope of the claims hereafter set forth.

DETAILED DESCRIPTION OF AN OPERATIVE EMBODIMENT OF THE INVENTION

Figure 1:
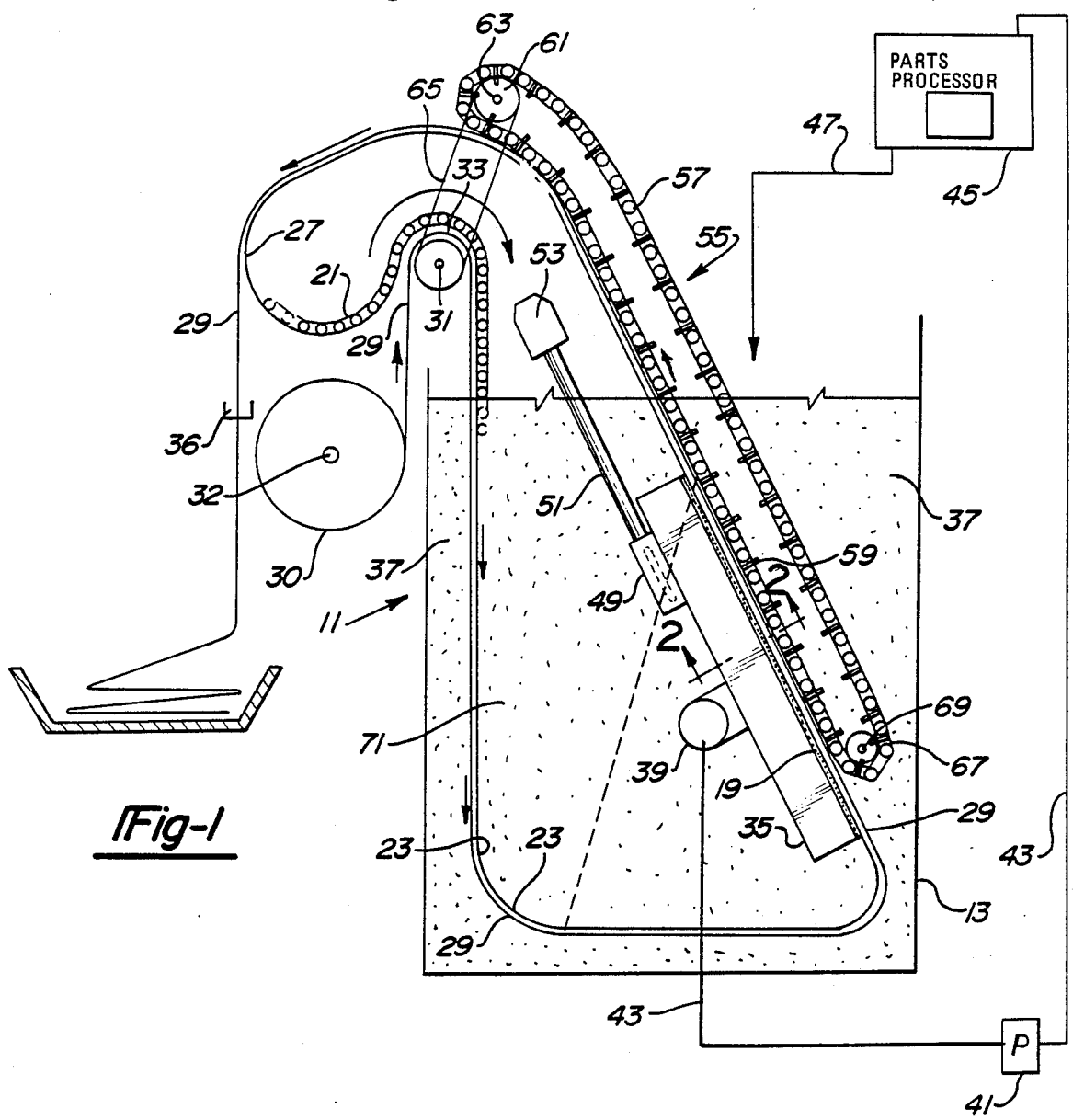
FIG. 1 is a side elevational and schematic diagram of one form of filter apparatus for industrial wash liquids incorporating an improved method and apparatus for conveying the filter media.
Figure 2:
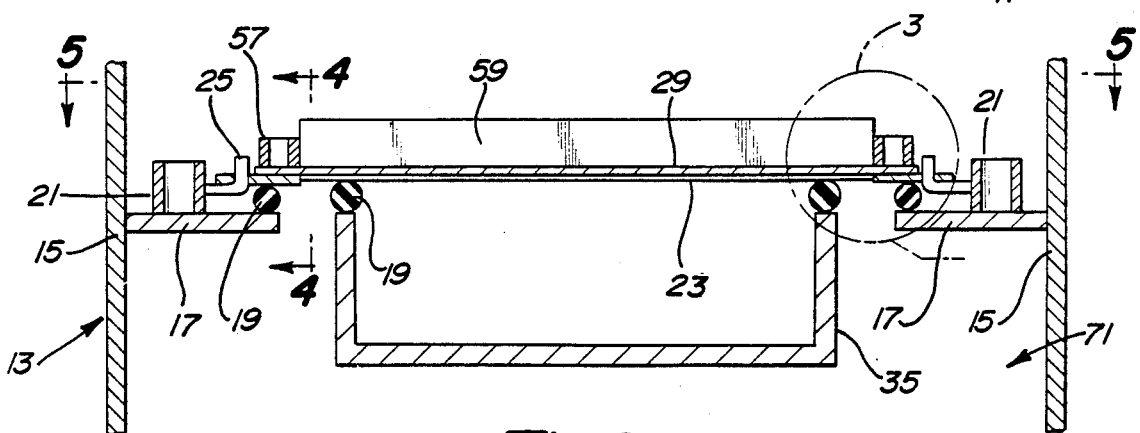
FIG. 2 is a transverse fragmentary sectional view taken in the direction of arrows 2—2 of FIG. 1 illustrating the mounting of the chain-operated filter screen within a filtration tank including the filter media, and on an increased scale.
Figure 3:
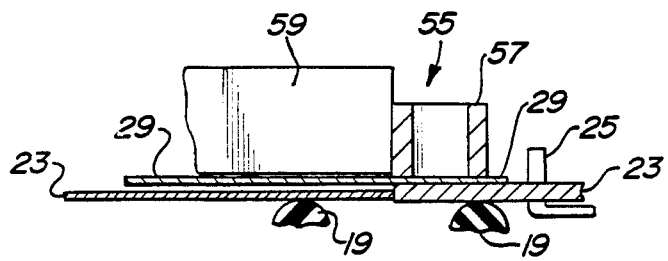
FIG. 3 is a similar view of the circled portion of FIG. 2, on an extended scale.
Figure 4:
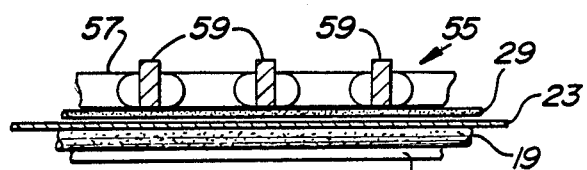
FIG. 4 is a fragmentary section taken in the direction of arrows 4—4 of FIG. 2.

Referring to FIGS. 1 and 2, a vacuum-assisted filtration apparatus is generally indicated at 11 and includes a tank 13 with opposed side walls 15. As is conventional, guideways 17 are mounted upon a pair of opposed walls 15, FIG. 2, and include at their outer longitudinal edges a continuous sealing bead 19.

A pair of opposed conveyor chains 21, FIG. 2, supportively mounted upon the guides 17 and movable thereon include a series of upturned hooks 25 adapted for positioning within longitudinally spaced grommets upon opposite longitudinal edges of the continuous conveyor screen 23, FIGS. 1 and 2. The support and mount for the conveyor screen within the tank and driven by a pair of conveyor chains upon guides 17 is further shown in Applicant's assignee's U.S. Pat. No. 4,650,571 dated Mar. 17, 1987. To the extent that further detail is shown in that patent as to the structure and mounting of the continuous screen and the drive therefor, such is incorporated by reference herein.

Just as in prior U.S. Pat. No. 4,650,571, there is herein the recognition that some automatic means are required reasonably conventional in the art for providing incremental longitudinal advances of the filter media 29 as it extends along the exterior of the conveyor screen 23, FIG. 1.

In the illustrative embodiment, the present conveyor screen is connected at its outer longitudinal edges to the respective conveyor chains 21 as supportably mounted upon the guides 17 adjacent opposed side walls 15 of the tank 13. The filter media 29 in the illustrative embodiment is about 51 inches wide, corresponding to the distance between hooks 25 of the conveyor screen and is in frictional engagement therewith and for normal movement therewith. The screen 23 extends over the sealing beads 19, FIG. 2.

FIG. 1 is essentially a diagram where a number of the elements are shown schematically including filter media roll 30. The filter media roll 30, supported and journaled as at 32, extends upwardly into operative engagement with the underside portion of the filter screen 23 sometimes referred to as the conveyor screen 23. Said screen upon its opposite sides is connected to opposite laterally spaced conveyor chains 21. These are supported upon and drivingly extend around the laterally spaced drive sprockets 33 upon the motorized drive shaft 31. The sprocket chains 21 follow the corresponding guides 17 upon the interior opposed walls tank 13 as continuous loops, fragmentarily shown in FIGS. 1 and 2.

The elongated open-top vacuum chamber 35 is supported within tank 13 and normally includes a peripheral sealing bead 19 at its open peripheral end adapted for cooperative registry with the continuous screen 23.

The filter media 29 which extends from the roll 30, and which in normal operation is stationary, extends down towards the bottom of the tank and around the exterior of the conveyor screen 23. The filter media 29 on its upward return sealingly bears against and covers the screen 23 which covers the open top and the corresponding sealing bead 19 around vacuum chamber 35. The filter media extends in a continuous manner to the top of FIG. 1 and dropping down as at 29 as spent media to a suitable collection area 36, schematically shown. There is thus defined within tank 13 upon the exterior of filter media 29 a body of unfiltered liquid 37 which is adapted to pass into vacuum chamber 35 and out through its outlet 39. Said outlet is connected to a conduit 43 and to a power-operated pump 41 for delivery to a parts processor 45, as schematically shown. Return dirty liquid from the processor drops back into tank 13 as shown by the arrow in FIG. 1, into the unfiltered liquid reservoir 37.

Upon the undersurface of vacuum chamber 35 and communicating therewith is a vacuum release valve 49, schematically shown, and through a tube 51 communicates with a valve operator 53. Under the condition of a substantial build-up of sludge and debris upon the stationary filter media 29 where it overlies vacuum chamber 35, the flow of pumped liquids therethrough and through the outlet 39 will be decreased to a very limited extent. This creates a vacuum build-up upon the interior of vacuum chamber 35. When the build-up reaches a present value, the vacuum release valve 49 is activated thereby controlling the valve operator 53. As is substantially conventional in vacuum-assisted filteration apparatus of the present type of apparatus, normally a solenoid opens the normally closed valve 49 to break the vacuum within vacuum chamber 35. After a short period through a timer, not shown, of approximately 5 to 10 seconds, energizes the motor drive for the shaft 31, FIG. 1, driving the conveyor chains 21. These in turn effect a longitudinal advance of the filter media 29 for a limited period such as 5 to 10 seconds sufficient for the debris-cluttered portion of the media which overlies the entrant opening to the vacuum chamber to pass therefrom upwardly. The drive for the sprocket drive shaft 31 is interrupted and full flow of liquids from the unfiltered liquid chamber 37 can again flow into vacuum chamber 35. Some of the unfiltered liquid will pass through adjacent exposed portions of the filter media upon the exterior of the vacuum chamber such as to enter the clean liquid reservoir 71.

In the illustrative embodiment, the vacuum chamber 35 is shown as rectilinear in shape. It is contemplated that the length or dimension of the vacuum chamber could be increased so that there is a larger inlet opening for unfiltered liquid for passing into the vacuum chamber and eventually through the outlet 39 and conduit 43 to the pump 41, FIG. 1.

Sometimes the filter media becomes so loaded with debris that there may be some general slippage between the conveyor screen 23 and the filter media 29. Such slippage may also be caused because of some grease which may have gotten onto the conveyor screen or upon portions of the media. The intermittently movable conveyor screen 23 becomes less effective in elevating the filter media 29 to the extent it is loaded with debris, for disposal to the spent media area 36, such as shown schematically in FIG. 1.

Figure 5:
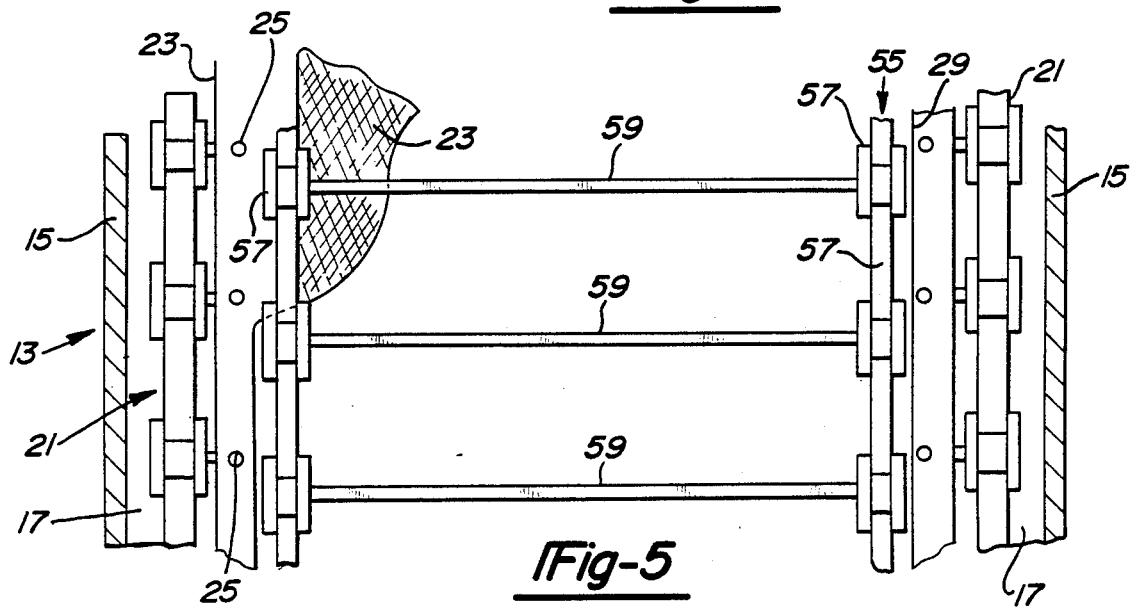
FIG. 5 is a fragmentary plan section taken in the direction of arrows 5—5 of FIG. 2.

The present invention includes the method and apparatus by which there is provided a tractor chain assembly sludge elevator generally indicated at 55, FIG. 1. The tractor chain sludge elevator includes a pair of laterally spaced continuous tractor chains 57, FIGS. 1 and 5, with a series of longitudinally spaced transverse cross-frames 59. The respective tractor chains are positioned partly within tank 13, FIG. 1, and project outwardly thereof and are arranged adjacent to and extend along the return flight of the conveyor chains 21. Tractor chains 57 engage corresponding drive sprockets 61, one of which is shown in FIG. 1. Said sprockets are secured upon drive shaft 63 and connected to the corresponding conveyor screen drive sprocket 33 by the sprocket chain 65. The opposite end portion of the corresponding tractor chains 57 extend around idler sprockets 67 journaled at 69 within tank 13.

The respective tractor chain assembly sludge elevator extends along and bears against the upper flight of the filter media 29 and is in positive friction drive engagement with the adjacent longitudinally extending conveyor screen 23. Thus, the present tractor chain assembly sludge elevator provides an improved method for assisting in conveying the filter media 29 using the tractor chains 57 and the corresponding cross-frames 59.

This provides for a positive upward movement of the filter media 29 and operates in conjunction with some feed movement from the conveyor screen 23.

The weight of the tractor chains 57 and their cross-frames 59 forces contact of the filter media 29 relative to the carries or conveyor screen 23 and the corresponding carrier screen sealing beads 19. This provides for increased frictional lifting engagement by the tractor chain assembly 55 against and with respect to the return flight of the filter media 29 and its adjacent conveyor screen 23.

In the previous discussion and wherein the operation of the valve operator 53 first breaks the vacuum which had been established in the vacuum chamber 35, this has the effect of releasing the debris and particles from the adjacent filter media 29 over vacuum chamber 35. The tractor chain design includes the transverse crossframes 59 which catch the debris upon the filter media 29 which has been released therefrom during the vacuum release interval. The sludge elevator 55, 57 effectively lifts such debris upwardly along with the simultaneous upward movement of the filter media 29 until the debris has travelled over the top to the assembly shown in FIG. 1 and drops down as at 29 into the collection area for spent media shown at 36.

Figure 6:
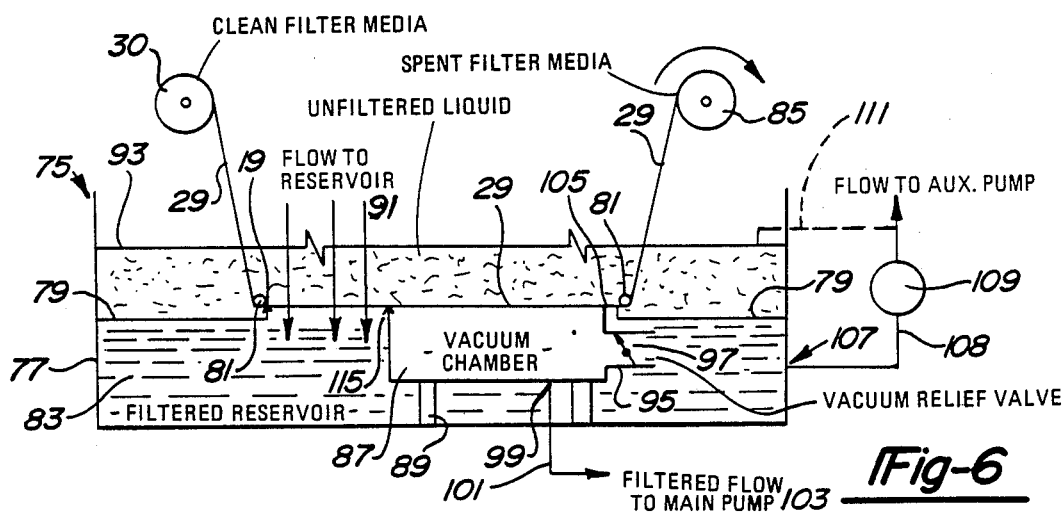
FIG. 6 is a schematic diagram of the modified filter apparatus.
Figure 7:
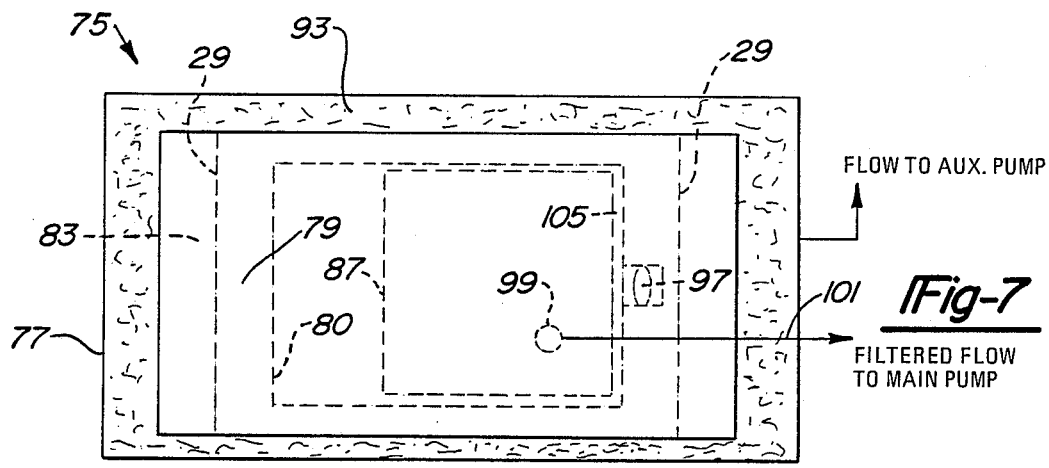
FIG. 7 is a plan view thereof.

A modified vacuum-assisted filter machine as schematically shown at 75 in FIGS. 6 and 7 and includes tank 77 and the horizontally disposed partition 79 having a central elongated aperture 80, FIG. 7. Extending from the media roll 30, FIG. 6 is the webbing or strip of filter media 29 which extends around the pair of longitudinally spaced guides 81 adjacent opposite ends of the aperture 80 so as to snugly overlie aperture 80, FIG. 7. The return extends over a corresponding take-up roll 85, normally under the control of the above-described conveyor screen 23, such as shown in FIGS. 1-5.

Filter media 29 extends over the sealing beads 19 which extend along the edges and perimeter of the aperture 80 in the partition 79 to thereby define with partition 79 the filtered liquid reservoir 83.

Elongated vacuum chamber 87 is immersed within filtered liquid reservoir 83 and has an open top with a corresponding peripheral sealing bead 115 thereon, FIG. 6, in engagement with the undersurface of the filter media 29. Accordingly, filter media 29 extends over and operatively engages the peripheral seal 115 at the open side of the vacuum chamber 87 so that unfiltered liquid 93 can pass through the filter media 29 and into the vacuum chamber 87. For clarity, the conveyor screen 23 of FIGS. 1-5 is omitted.

Vacuum chamber 87 is suitably supported within tank 77 as by the supports 89. The flow of unfiltered liquid at 91 further passes through the media 29 and into the filtered liquid reservoir 83.

Vacuum chamber 87 has an outlet 95, sometimes referred to as a second outlet, in communication with the filtered liquid reservoir 83 within which is nested a normally closed vacuum release valve 97.

The vacuum chamber 87 has a first outlet or pump outlet 99 connecting a conduit 101 which extends outwardly of the tank 77 for connection to a main flow pump 103 by which filtered liquids may be pumped an exterior area such as a procesor shown schematically in FIG. 1 and for subsequent return to the unfiltered liquid area 93 in FIG. 6.

One end of the vacuum chamber 87 is spaced from the partition aperture 80 to define an elongated flow passage 105 for auxiliary filtered fluids from the unfiltered liquid reservoir 93 into the filtered liquid reservoir 83, FIG. 6.

A return conduit 111 optionally redirects auxiliary flow of filtered liquids back into reservoir 93 for replenishing the liquids within the tank 77. Pump 109 (probably a jet pump) continuously removes reservoir liquid that may be contaminated by seal leakage.

The media seal 115, FIG. 6, extends around the periphery of the open end of the vacuum chamber 87 for cooperative sealing registry with filter media 29. Thus, an improved method is provided for maintaining a clean liquid reservoir 83 for the vacuum release mechanism, namely the vacuum release valve 97, and wherein the filtered liquid reservoir 83 is internal to the filter unit 75. This reservoir is usually outside the filter tank and fed from a tap from the main pump.

The reservoir 93 is replenished through aperture partition edge 80 and vacuum chamber 87, even during use if desired. The reservoir 83 needs no external means of supply. In some situations, however, when the filtered fluids are delivered to a wash area, the accumulated fluids with particulate therein are often returned to the unfiltered liquid reservoir 93.

Reservoir 83 thereby encompasses the vacuum chamber 87, thereby isolating it from the media seal 19 to seal the vacuum chamber against any medial seal failures at 115.

The reservoir 83 may be optionally and continuously depleted with use of the auxiliary pump 109, conduit 108 and outlet 107 in order to remove any contaminant which may have been admitted during a media seal failure as at 115.

Vacuum release valve 97 is normally closed and is attached directly to the vacuum chamber 87, FIG. 6, to eliminate piping and additional labor. Thus, the vacuum release valve is internal to the filter unit 75 to reduce the unit's exterior clearance dimensions. If during operation of the filter assembly 75 there is a build-up of sludge and debris upon the filter media 29 at the open side of the vacuum chamber 87 sufficient to cause a reduction in the flow of filtered fluids therethrough, a vacuum will build up in said vacuum chamber. When the vacuum reaches a present level it will automatically open the vacuum release valve 97. This will have the effect as above described of initially breaking the vacuum condition within the vacuum chamber and secondly of energizing the filter screen drive chain 21, FIG. 1, and the conveyor screen 23 such as will advance the filter media sufficiently forward for a limited time period as will present clean filter media 29 to the open intake side of vacuum chamber 87.

Figure 8:
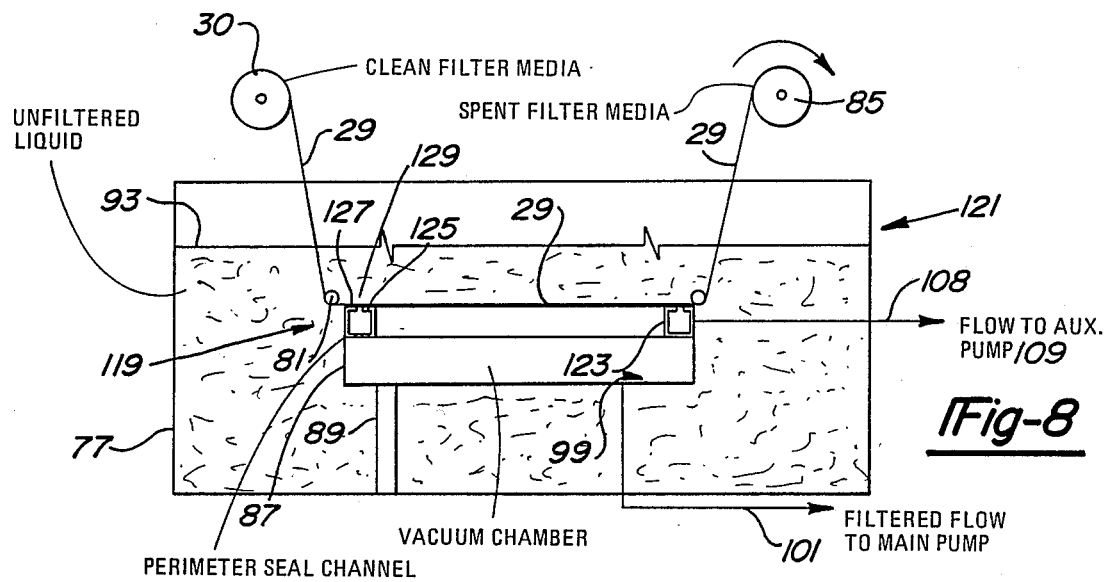
FIG. 8 is a schematic elevational view and diagram of a further modified filtration apparatus.
Figure 9:
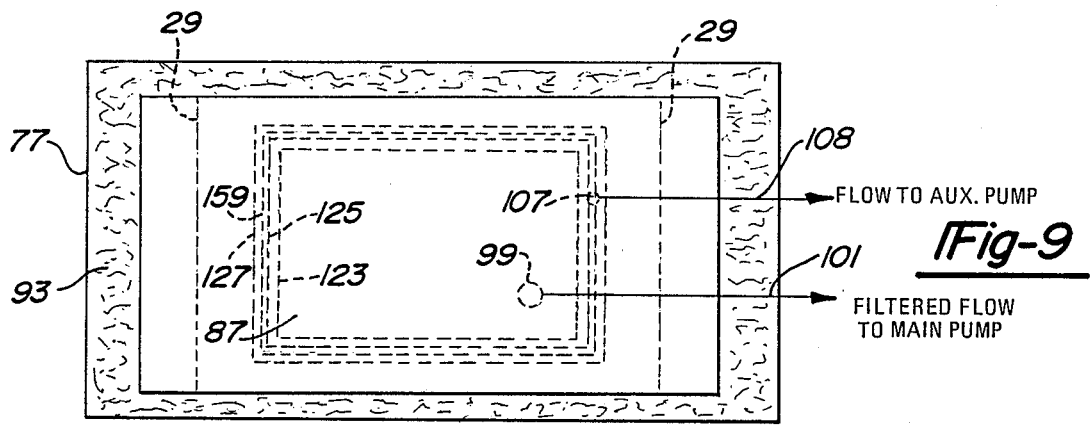
FIG. 9 is a plan view thereof.

A modified vacuum chamber isolation apparatus 119 is shown in FIGS. 8 and 9 for use in conjunction with the vacuum-assisted filter machine 121.

The construction is similar to what is shown in FIG. 6 except that the vacuum chamber 87 is supported at 89 within tank 77 and spaced below filter media 29. Continuous perimeter seal channel 123 is mounted upon and extends around the top of the vacuum chamber 87 and is suitably secured thereto and functions as a filter media to vacuum chamber seal. Channel 123 is in operative engagement with the undersurface of the filter media 29, FIG. 8, and/or conveyor screen 23, FIG. 1.

Figure 11:
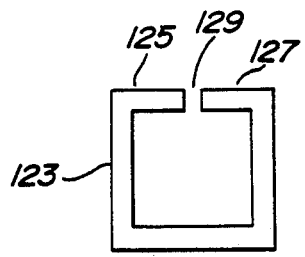
FIG. 11 is a fragmentary section of the sealing channel of FIG. 8, on an increased scale.

A continuous intermediate slot or opening 129 extends through the top of the perimeter seal channel 123 and defines upon its opposite sides a continuous elongated inner seal surface 125 and the continuous outer seal surface 127, further shown in FIG. 11.

Optionally, the channel 123 may be used as a vacuum chamber perimeter seal as shown in FIG. 8. The opening of the channel faces the filter media 29 and presents two distinct seal surfaces 125, 127. The outer seal 127 prevents flow of unfiltered liquid into the channel 123. The inner seal 125 prevents flow from the channel to the vacuum chamber 87. With the channel 123 being under negative pressure through the conduit 108 through the tank wall 77 to the auxiliary pump 109, any unfiltered liquid that breaches the outer seal 127 can be withdrawn from the seal channel 123 in an attempt to prevent it from breaching the inner channel seal 125 and thereby contaminating the interior of the vacuum chamber 87.

In operation, the conduit 108 communicates with an auxiliary pump outlet 107 for flow outwardly as shown by the arrow, FIG. 9, to the auxiliary pump 109.

Figure 10:
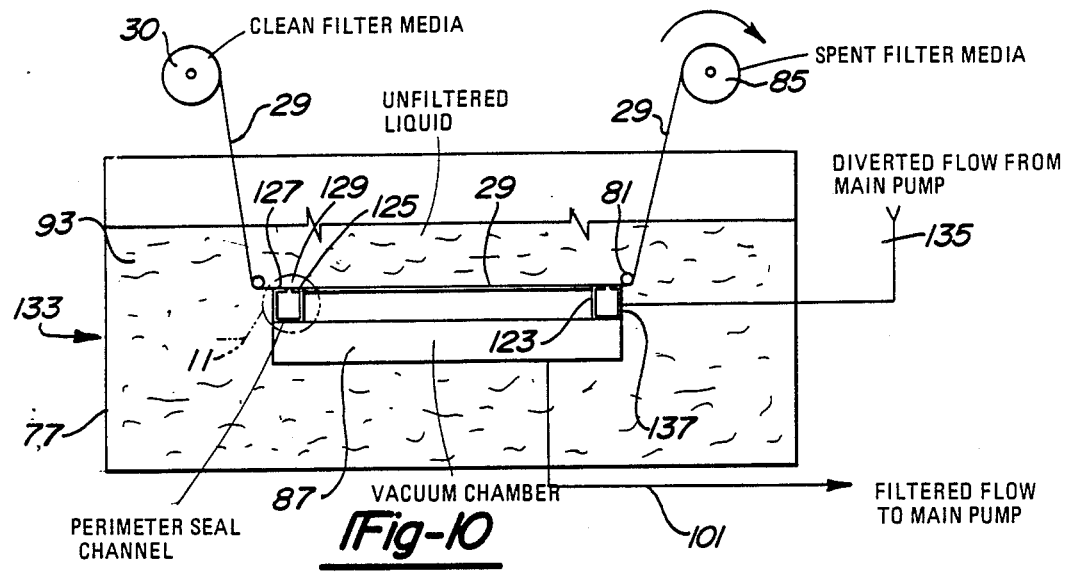
FIG. 10 is a schematic diagram of a first modification of the apparatus shown in FIG. 6.

With respect to the vacuum-assisted filter apparatus or machine designated schematically at 133 in the diagram, FIG. 10, channel 123 has connected thereto an inlet 137 which is connected to a diversion from the flow the main pump at 135, as schematically shown, to pressurize the interior of channel 123. Thus, the above perimeter seal channel 123 may optionaly operate with a positive pressure with respect to the unfiltered liquid 93 in an attempt to discourage the unfiltered liquid from breaching the channel's outer seal 127.

Figure 12:
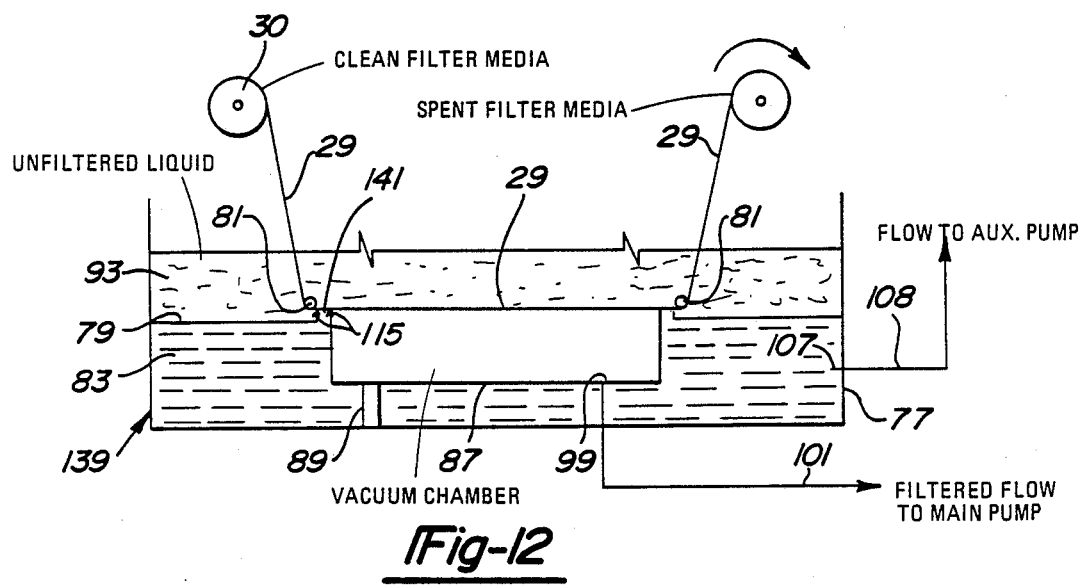
FIG. 12 is a schematic diagram of a second modified filtration apparatus.

A modified vacuum-assisted filter apparatus 139 is shown in FIG. 12 illustrating a construction similar to the filtration apparatus shown in FIG. 6 and which includes the apertured partition 79 defining therebelow the clean liquid reservoir 83 and thereabove the dirty or unfiltered liquid reservoir 93.

Figure 13:
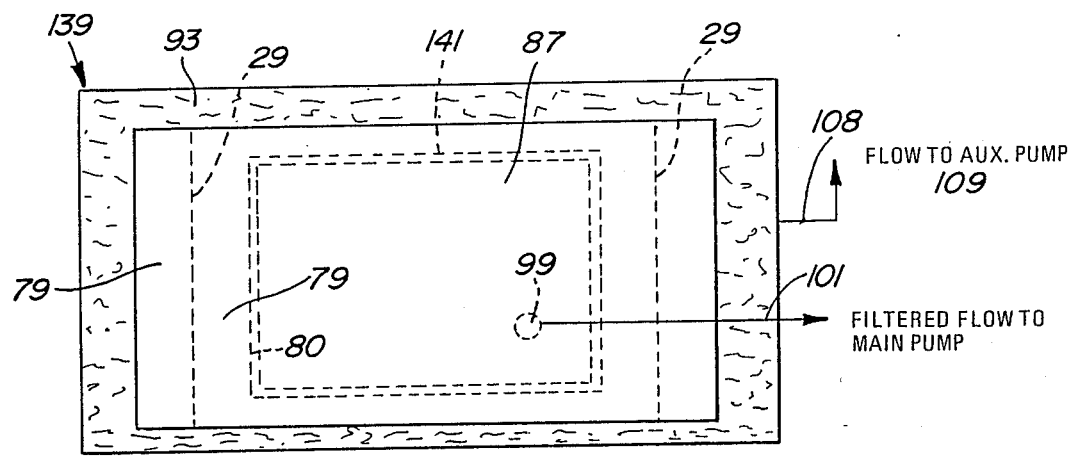
FIG. 13 is a schematic plan view thereof.

The vacuum-assisted filter apparatus 139, FIGS. 12 and 13, is similar to that shown in FIG. 6, and the description of commonly identified parts is not repeated. The vacuum chamber 87 is positioned within the corresponding elongated aperture 80 within the partition 79 so as to define a peripheral channel 141 for filtered liquid which surrounds the vaccum chamber. In this variation of the vacuum-assisted filter apparatus, vacuum chamber 87 supported at 89 such that its edges engage the overlying filter media 29 normally seals over the corresponding bead 115 upon vacuum chamber. This provides a channel 141 surrounding vacuum chamber 87, FIG. 12.

Channel 141 contains filtered liquid 83 as it passes from the upper reservoir 93 of unfiltered liquid through the media 29 and through the corresponding channel 141 down into the filtered media reservoir 83.

Pump 109 through conduit 108 and outlet 107 withdraws potentially contaminated liquid from reservoir 83.

Figure 14:
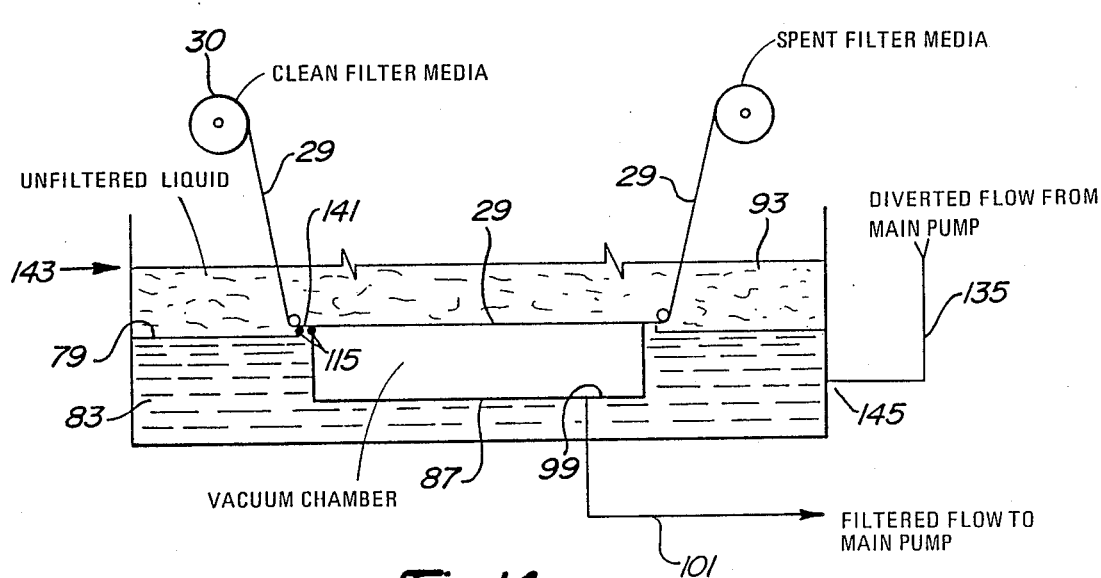
FIG. 14 is a schematic elevational diagram of a further modification of the filtration apparatus shown in FIG. 6.

The modified vacuum-assisted filter apparatus 143, FIG. 14, is substantially the same as that shown in FIG. 12 except that instead of withdrawing liquids at 108 through the auxiliary pump 109, the filtered liquid reservoir 83 is pressurized by the delivery of pressurized filtered fluids through the conduit 135 from the main pump 103 through fitting 145 back into the reservoir 83. This causes some upward movement of the filtered liquids through the surrounding peripheral channel 141 around the vacuum chamber for the passage of fluid through the filter media 29 and into the unfiltered liquid chamber 93. This prevents entry of unfiltered liquid into vacuum chamber 87.

Having described my invention, reference should now be had to the following claims.

I claim:

1. In a filter apparatus for industrial process liquids, a tank receiving and containing unfiltered liquids, a continuous conveyor screen guidably mounted within the tank and projecting therefrom, the improvement comprising:

a continuous filter media overlying the tank guidably retained against said conveyor screen for horizontal movement within the tank and outwardly thereof;

an open-top vacuum chamber supported within said tank underlying said filter media;

a continuous perimeter seal channel overlying and surrounding said vacuum chamber and bearing against said filter media, said media spanning said sealed channel;

an outlet upon said vacuum chamber connected to a conduit extending from said tank connected to a pump for delivering filtered liquids to a process area;

the top of the channel having a continuous slot therein defining elongated continuous inner and outer seal surfaces engaging said filter media;

the outer seal surfaces preventing flow of unfiltered liquid into the channel;

the inner seal surfaces preventing flow from the channel into the vacuum chamber;

said channel having a lateral outlet connected to a conduit which extends from the tank, and is connected to an auxiliary pump, thereby providing a negative pressure within the channel, so that any unfiltered liquid that breaches the outer seal is withdrawn from the sealed channel to prevent it from breaching the inner channel seal.

2. In a filter apparatus for industrial process liquids, a tank receiving and containing unfiltered liquids, a continuous conveyor screen guidably mounted within the tank and projecting therefrom, the improvement comprising:

a continuous filter media overlying the tank guidably retained against said conveyor screen for horizontal movement within the tank and outwardly thereof;

an open-top vacuum chamber supported within said tank underlying said filter media;

a continuous perimeter seal channel overlying and surrounding said vacuum chamber and bearing against said filter media, said media spanning said sealed channel;

an outlet upon said vacuum chamber connected to a conduit extending from said tank connected to a pump for delivering filtered liquids to a process area;

the top of the channel having a continuous slot therein defining elongated continuous inner and outer seal surfaces engaging said filter media;

the outer seal surfaces preventing flow of unfiltered liquid into the channel;

the inner seal surfaces preventing flow from the channel into the vacuum chamber;

said channel having a lateral outlet connected to a conduit which extends from the tank, and is connected to the outlet of said pump for pressurizing said channel with respect to the unfiltered liquid reservoir to prevent unfiltered liquid from breaching the channel outer seal.

3. In a filter apparatus for industrial process liquids, a tank, a continuous conveyor screen guidably mounted within the tank and projecting therefrom, the improvement comprising:

a horizontal partition spanning the tank walls and having an elongated aperture therethrough;

media sealing means upon the partition surrounding said aperture;

a continuous filter media overlying the tank guidably retained for sealing engagement with said sealing means, spanning said aperture and operatively engaged by said conveyor screen;

said filter media providing upon the underside of said partition an enclosed filtered liquid reservoir and upon its other side an open unfiltered liquid for receiving unfiltered liquid;

an elongated open-top vacuum chamber supported within said filtered liquid reservoir with its peripheral edge in sealing registry with said filter media and having a first outlet connected to a pump for delivering filtering liquid to a process area;

longitudinally spaced guide means upon said tank guiding said filter media into cooperative engagement with the sealing means upon said partition and the open top of said vacuum chamber;

a peripheral sealing bead around the open top of said vacuum chamber in registry with said filter media;

said vacuum chamber being spaced within said partition aperture defining a peripheral channel surrounding said vacuum chamber and filled with filtered liquid;

an outlet conduit communicating with said channel, extending through said tank, and is connected to an auxiliary pump; and the sealing edges of said vacuum chamber relative to said filter media being surrounded by filtered liquid.

4. In the filter apparatus of claim 3, further comprising said auxiliary pump creating a reduced pressure within the filtered liquid chamber providing a flow of filtered liquid completely around the sealing edges of ssaid vacuum chamber.

5. In a filter apparatus for industrial process liquids, a tank, a continuous conveyor screen guidably mounted within the tank and projecting therefrom, the improvement comprising:

a horizontal partition spanning the tank walls and having an elongated aperture therethough;

media sealing means upon the partition surrounding said aperture;

a continuous filter media overlying the tank guidably retained for sealing engagement with said sealing means, spanning said aperture and operatively engaged by said conveyor screen;

said filter media providing upon the underside of said partition an enclosed filtered liquid reservoir and upon its other side an open unfiltered liquid reservoir for receiving unfiltered liquid;

an elongated open-top vacuum chamber supported within said filtered liquid reservoir with its peripheral edge in sealing registry with said filter media and having a first outlet connected to a pump for delivering filtered liquid to a process area;

longitudinally spaced guide means upon said tank guiding said filter media into cooperative engagement with the sealing means upon said partition and the open top of said vacuum chamber;

a peripheral sealing bead around the open top the said vacuum chamber in registry with said filter media;

said vacuum chamber being spaced within said partition aperture defining a peripheral channel surrounding said vacuum chamber and filled with filtered liquid; and an outlet conduit communicating with said channel, extending through said tank, and is connected to provide diverted flow from said pump and the diverted flow providing a positive pressure within the filtered liquid reservoir communicating with said channel for passage of filtered liquid into the unfiltered liquid reservoir for deflecting and discouraging unfiltered liquid from breaching said media sealing means.

* * * * *